United States Patent [19]

Reuyl

[11] 4,182,960
[45] Jan. 8, 1980

[54] INTEGRATED RESIDENTIAL AND AUTOMOTIVE ENERGY SYSTEM

[76] Inventor: John S. Reuyl, 2280 Hanover St., Palo Alto, Calif. 94306

[21] Appl. No.: 910,234

[22] Filed: May 30, 1978

[51] Int. Cl.² .............................................. H02P 9/04
[52] U.S. Cl. .............................. 290/1 R; 136/89 AC; 136/89 HY; 126/427
[58] Field of Search ................. 290/1 R, 2, 1 A, 4 R, 290/44, 55; 180/65 C, 65 A, 1 R; 237/1 A, 12.3 R, 12.1; 60/676, 641, 668, 648

[56] References Cited

U.S. PATENT DOCUMENTS

| | | | |
|---|---|---|---|
| 3,381,316 | 5/1968 | Anderson | 237/12.3 R |
| 3,944,837 | 3/1976 | Meyers et al. | 290/40 R |
| 3,946,242 | 3/1976 | Wilkerson | 290/4 R |

Primary Examiner—Gene Z. Rubinson
Assistant Examiner—Morris Ginsburg
Attorney, Agent, or Firm—Poms, Smith, Lande & Rose

[57] ABSTRACT

An integrated system including a residence and an automobile utilizes environmental energy, such as solar energy, as the primary energy source, and the automobile provides a backup or supplementary source of energy for this system. An exemplary system has photovoltaic and thermal collectors associated with the residence for collecting radiant solar energy and converting a portion thereof to electricity and to heat, and residential energy storage means for storing energy generated within the integrated energy system; hybrid electric drive means associated with the automobile in this exemplary system includes batteries for storing electrical energy generated within the integrated energy system, an electrically energized motor to propel the automobile, and a liquid-fueled combustion engine for driving an associated electrical generator to function as a backup or supplementary source of energy for both the residence and the automobile. Interface umbilicals interconnect the residence and the automobile to enable energy to be selectively transferred from the residence to the automobile, and from the automobile to the residence, under the control of suitable sensing and control circuits.

19 Claims, 4 Drawing Figures

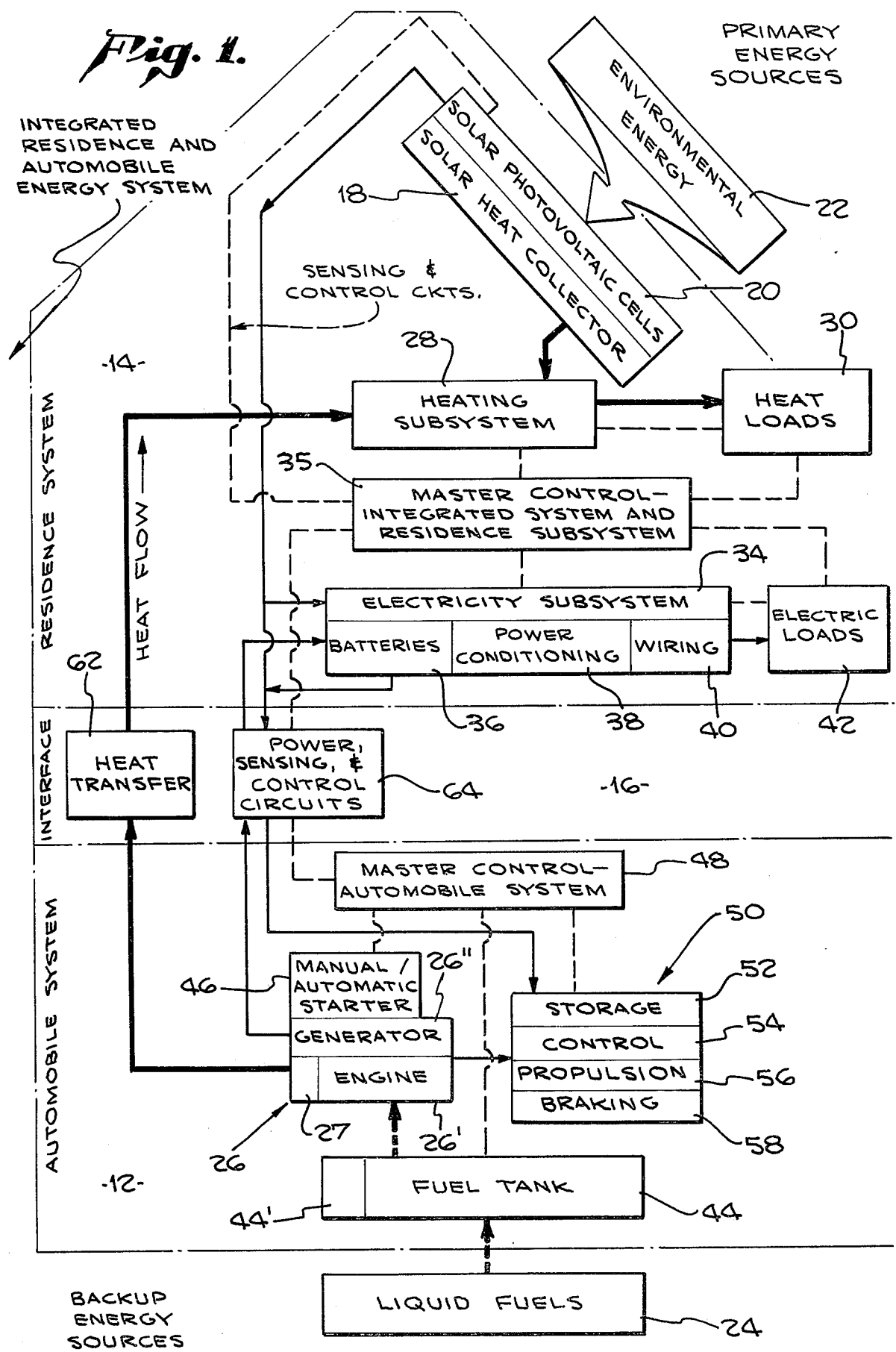

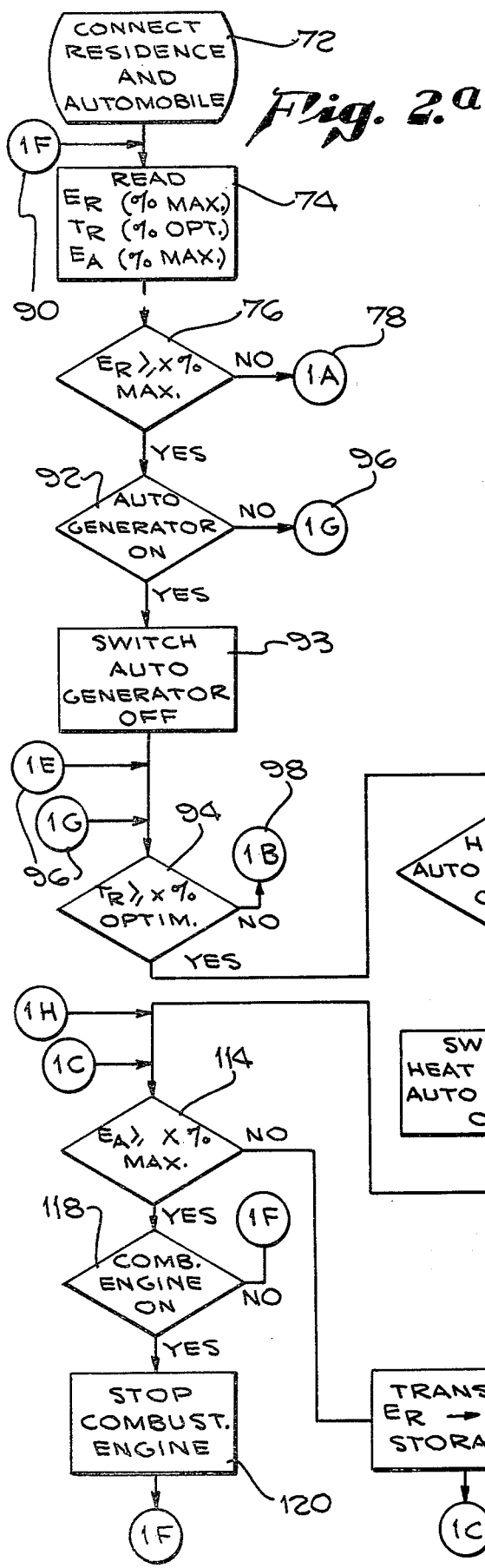

INTEGRATED RESIDENTIAL AND AUTOMOTIVE ENERGY SYSTEM

FIELD OF THE INVENTION

The present invention relates in general to energy systems involving both a residence and a vehicle, and utilizing an environmental energy source.

BACKGROUND OF THE INVENTION

Currently, it is common in both urban and rural areas to depend upon established energy infrastructures, such as electric power and natural gas utilities and the corner gas station, to satisfy the energy needs of the average family. In the final analysis, the major source of energy for these infrastructures is fossil fuel, either as a direct energy source for heat and to power the family automobile, or indirectly as electricity. This reliance upon fossil fuels results in a drain upon fossil fuel resources; additionally, the increasing environmental impacts associated with the consumption of fossil fuels is becoming critical.

Due to the finite limits of fossil fuel reserves and the rapidly increasing U.S. and global demands for energy, alternative energy sources and systems must be developed. In order to be financially and politically viable, such alternatives must be reliable and economical when compared to the currently existing technologies which utilize fossil fuel.

A most readily available source of energy, and one which has been utilized in a very limited way for satisfying certain residential energy requirements of a single-family residence, is solar radiation. Solar radiation has been used for the space heating of a residence by heat transfer to a liquid or "heat storage medium," as illustrated by Thomason, U.S. Pat. No. 3,236,294.

Solar energy has also been converted directly to direct current by various photovoltaic devices, as illustrated by Bell, U.S. Pat. No. 4,002,031. These photovoltaic collector schemes may additionally incorporate some provision for collecting waste heat from the collectors for use in heating needs of the residence.

The various prior art approaches to satisfying certain residential energy needs by utilizing solar radiation as a primary energy source are less than optimum from reliability and economic viewpoints. Extensive backup systems are required for those times when solar radiation is unavailable or insufficient, such as during periods of cloudy weather. In relying upon public utilities for a back-up, the capital expenses would be relatively high; further, such systems would be even less desirable in suburban and rural locations due to the additional expense of extending the public utility service to the residence. The utility's "peak loading" problems also tend to be aggravated by solar homes that depend upon the utility just for backup power.

In considering the energy requirements of the family, it should also be recognized that a majority of families rely upon the automobile as a primary means of transportation. Once again, fossil fuels, specifically petroleum-based liquid fuels, have been utilized as the primary energy source, and the foregoing remarks concerning conservation and pollution apply with ever greater force to the conventional automotive internal combustion gasoline engine.

To avoid the necessity of burning fossil fuels, electric-drive automobiles have been proposed. Such experimental electric automobiles are attracting increasing attention due to the general impression that such a power source will decrease air pollution from unburned hydrocarbons. The basic idea is to charge such automobiles' electrical storage devices from the electric utility during off-peak nighttime hours. The problem with such an approach is that, although one avoids air pollution from the automobile engine, one incurs increasing pollution at the central electric power plant, and additionally, increases the demands upon the utility for more central power plants and more electrical power distribution systems. Further, the public is left with the problem of how to refuel such electric cars during the day if the batteries are drained, as battery charging is usually a lengthy procedure.

In order to solve the problems inherent in an all-electric automobile, experimental hybrid electric automobiles have been developed. These hybrid electric automobiles combine an electric-drive motor with an on-board liquid fossil-fueled engine. Illustrative of such hybrid electric automobiles are the automobiles shown in Berman, U.S. Pat. Nos. 3,566,717 and Toy, 3,525,874. It is noted, however, that these hybrid electric automobiles would, once again, rely either upon the public utilities for electrical power or upon the corner gas station for liquid fuels as their primary sources of energy. Thus, the problems of fossil fuel consumption and the attendant environmental impacts thereof are not resolved but are merely divided between the automobile and the electric utility.

SUMMARY OF THE INVENTION

It is therefore a primary object of the present invention to disclose and provide an integrated system including both a residence and an automobile wherein environmental energy, such as solar radiation and wind, is the primary energy source for the system.

It is a further object of the present invention to provide an integrated energy system wherein an automobile provides a supplemental source of energy during the periods of time when environmental energy is insufficient to satisfy the needs of the system.

It is a further object of the present invention to provide an integrated energy system wherein environmental or solar energy is the primary energy source for the system and wherein reliance upon public utilities and fossil fuel consumption is drastically reduced and even substantially eliminated.

It is a further object of the present invention to provide a method of and apparatus for controlling the flow of energy within the aforedescribed integrated energy system to balance the availability of energy within the system relative to the energy demands within the system.

Generally stated, the integrated energy system of the present invention includes the provision of an environmental energy collector, such as solar photovoltaic cells or a windmill, associated with the residence for collecting energy and for converting a portion of the environmental energy to electrical energy. Residential energy storage means are provided for storing electrical energy generated within the integrated energy system. Hybrid electric drive means associated with the automobile include a combustion engine for driving an associated electrical generator on board the automobile, automobile energy storage means for storing electrical energy generated within the integrated energy system and an electrically powered primary automobile drive motor for propelling the automobile. Interface means are provided for interconnecting the residence and the automobile and for selectively transferring energy from the residence to the automobile, and from the automobile to the residence in response to relative energy storage levels within the residential energy storage means, and the automobile energy storage means and energy demands within the integrated system.

Additionally, the integrated energy system of the present invention may comprise thermal energy storage means associated with the residential energy storage means for storing thermal energy, including radiant solar energy absorbed by the photovoltaic collector means as well as thermal energy generated within the integrated system.

Further, the interface circuitry of the present invention may include sensors for determining electrical energy storage levels within the residential energy storage means and the automobile electrical storage means, circuitry for transferring electrical energy from the residential energy storage means to the automobile electrical energy storage means when the electrical energy storage level of the residential energy storage means is greater than or equal to a predetermined value and when the electrical energy storage level of the automobile electrical storage means is less than a maximum storage value. Control circuitry arrangements are also provided for starting up the automobile combustion engine, and transferring the generated electrical energy and heat to the residential energy storage means when the energy storage levels of the residential energy storage means is less than a predetermined value.

A more complete understanding of the improvements in energy systems in accordance with the integrated energy system of the present invention, as well as a recognition of additional objects and advantages thereof, will become apparent from a consideration of the following detailed description of an exemplary embodiment thereof. Reference will be made to the appended sheets of drawings which will first be discussed briefly.

BRIEF DESCRIPTION OF THE DRAWINGS

FIG. 1 is a diagram showing the primary source of energy from the environment, the backup source of energy from liquid fuels for the automobile, the residence electrical and heating subsystems and control systems, and the automobile system and control circuitry, together with their interconnections; and FIGS. 2a, 2b and 2c is a sequence control diagram setting forth one mode of operation of the system of FIG. 1 under different operating conditions.

DETAILED DESCRIPTION

With reference to the drawings, FIG. 1 includes several major sections. These major sections include the automobile system 12, the residence system 14, the interface system 16, the environmental energy collection units 18 and 20 and, shown for completeness, the source of environmental energy 22, and the source of liquid fuel 24 to power the combustion engine and generator unit 26, included in the automobile system 12.

Now, considering the various subsystems in greater detail, the solar photovoltaic cells 20 and the solar heat collector 18 are shown at an angle to represent their positioning to face the south at a suitable angle of approximately 40° for maximum collection of the sun's rays. For convenience these units 18 and 20 may be located on the roof of a home; alternatively, they could be mounted on other structures such as patio covers or on racks in an otherwise unusable section of land, or in an area where partial shade or overhead cover was desirable.

The solar heat collector 18 may be directly associated with the solar photovoltaic array, collecting the so-called "waste heat" from the array, and/or the solar heat collection may be separate units of either or both passive and active design in accordance with known systems. Passive systems would include good solar heating and cooling features as part of the architectural design, while active systems frequently involve circulating liquids or air. In FIG. 1 the heating subsystem, including heat storage, is designated by the reference numeral 28, and various heat loads such as the hot water heater and the duct system in a residence for space heating are designated by the reference numeral 30. Incidentally, it may be noted that the heat flow is designated by a very heavy black line; the electrical power connections by medium weight lines and the control or sensing interconnections are indicated by dashed lines. In addition, the fluid flow is indicated by heavy dashed lines.

Continuing with the description, electricity from the photovoltaic array 20 is routed to the electrical subsystem for the residence designated by the reference numeral 34. This includes the batteries 36, the power conditioning circuitry 38 to provide the desired voltage levels and form of current, either alternating or direct, and the house wiring 40. The electrical loads 42 may include an electric stove, appliances, lighting, radios, and television sets, for example.

Turning to the automotive system 12, in addition to the engine and electrical generator combination 26, this system includes the fuel tank 44, the manual and automatic starter 46, the master control for the automotive system 48 and various automotive subsystems designated 50 including extensive storage capabilities for the generated electricity as indicated by block 52, the automotive control subsystem 54, the propulsion system 56 which includes an electric motor and the drive train, and the braking system 58. Additional blocks shown in FIG. 1 include the interface umbilical involving the heat transfer connection 62 and the power, sensing, and control circuits 64.

Before going into the operation of the system in detail, it may be broadly stated that the present system involves the normal operation of the entire system from power supplied by the photovoltaic array 20 and the solar heat collector 18. More specifically, the capacity of the photovoltaic cells 20 and the batteries 36 in the residential system is large enough that the automotive storage batteries 52 may be charged to full capacity at night while the automobile is parked at the residence and is electrically interconnected to the residential system. However, under adverse weather conditions when, for example, there has been no sun for several days, the automobile may supply electricity to the residence subsystem on an automatic basis. More specifically, when the automobile is parked at the residence and is connected by the interface circuitry to the residential system and following the setting of suitable control switches and closing the proper circuits, the electricity storage level of the residential storage subsystem is sensed; then, if the storage level of the batteries 36 is below a predetermined level, the engine generator 26 in the automobile is automatically turned on, and power is supplied directly to the home residence system to charge up the batteries 36 and thereby provide power for the home under these adverse conditions. By this arrangement, the size of the batteries 36 may be held to a reasonable level, and capital investment thereby controlled. Thus, the present system whereby the vehicle is normally powered from environmental energy, but wherein the residential system and the automobile system may be supplied energy from the liquid fueled engine generator in the vehicle under emergency conditions, provides an integrated system which is superior to that which is achieved when the two subsystems are treated separately or when it is necessary to rely on the utilities for some energy.

Incidentally, as a collateral advantage, the heat generated by the engine generator 26 may be supplied through a heat transfer connector 62 to supply some or all of the residential heating needs. More specifically, heat which is drawn via heat exchangers from the automotive exhaust system and/or from the automotive cooling system may be selectively supplied to the residence to supplement the reduced levels supplied by the solar heat collector 18. Suitable valving or control arrangements may be provided at the car, in the residence or at the intermediate point indicated by block 62. In this connection it may be noted that, when there has been a period of several days with no sunshine or during which the sunshine levels have been below normal, the batteries 36 will be at a low charge level, and the heating requirements of the residence may also be substantial. Accordingly, when the engine generator 26 must be run at night to satisfy the need to recharge the batteries 36 in the residence, it is also frequently desirable that heat be transferred from the engine generator unit 26 to the residential heating subsystem 28.

The simplicity of the control circuits associated with the system of FIG. 1 is such that hard wired control circuits are practical. However, if data processing circuitry is available within the residence primarily for other purposes, it may also be applicable to the energy system of FIG. 1. In either case, whether hard wired circuits or data processing circuitry is employed, one of many modes of automatic operation of the system of FIG. 1 is diagrammed in some detail in the logic and sequence diagrams of FIGS. 2a, 2b, and 2c.

Referring more particularly to FIG. 2, in FIG. 2A the first step 72 indicates the step of interconnecting the residence and automobile systems. This would normally occur at night when the automobile is returned to the residence, probably in the garage, the engine generator 26 is turned off if it is running, and the interface umbilicals are connected. This may be accomplished either by the manual interconnection of electrical power and control connectors and heat transfer equipment, or it may be accomplished automatically by driving the automobile into a track provided in the garage so that resiliently-mounted electrical and heat transfer equipment is guided into connection as the car is rolled into place in the garage. The next step as indicated by block 74 is to determine the energy $E_R$ stored in the residential electrical energy storage batteries 36, the thermal energy $T_R$ stored in the residence, and the electrical energy $E_A$ stored in the automobile batteries 52. Sensing and control is accomplished by the master control subsystems 35 and 48.

Diamond 76 indicates the determination as to whether the energy stored in the residence $E_R$ is equal to or greater than some percentage X of the maximum charge which may be stored in the batteries 36. If it is not up to this desired level, which may be preset, the sequence switches, via the circle 78 which is designated "1A" to FIG. 2B. The initial determination in FIG. 2B, as indicated by diamond 80, is whether or not the combustion engine 26' is energized or not, and if it is not, a control signal, indicated by block 82, serves to start it up. The diamond 84 indicates the determination as to whether the auto electrical generator 26" is on, and if not, the block 86 indicates that it is to be started up or coupled to the engine 26'. Block 88 represents the step of electrically connecting the output from the generator 26' to charge up the batteries 36 included in the residential subsystem 34. The circle 90 closes the loop to the input of block 74 and the diamond 76 which again determines whether the storage batteries 36 have reached the charge level where $E_R$ is greater than the preset value and if the answer is "yes" a determination, as indicated by diamond 92, is made as to whether the auto generator is on. If "yes", then the generator is switched off, per block 93. If "no", the next step in the sequence is to shift to the diamond 94 and this is indicated by the circles designated 96. Diamond 94 represents the determination as to whether the thermal energy stored in the residence is equal to or greater than a preset percentage of the optimum stored thermal energy. If not, the combustion engine is turned on as indicated by the logic path represented by circle 98 and diamond 100, as well as the block 102 (see FIG. 2c). The state of the heat transfer connection 62 is next sensed, as indicated by diamond 104, and if it is not in the heat transferring mode, this is changed as indicated by block 106, with the result as indicated by block 108 that the residential thermal storage $T_R$ is augmented.

If a "yes" answer is indicated by diamond 94, showing that the thermal storage in the residence is equal to or greater than the optimum level, then diamond 110 and block 112 indicate that the heat transfer control unit 62 should be closed, preventing heat transfer. Diamond 114 indicates the determination as to whether the automotive batteries are fully charged. If not, the block 116 indicates the transfer of energy from the residential battery units 36 to the automotive storage batteries 52. Diamond 118 represents a determination of whether the combustion engine 26' is on, under conditions when the automotive storage batteries are substantially fully charged, and the charge of batteries 36 is equal to or greater than a predetermined level. If so, block 120 indicates that the combustion engine 26' should be shut off.

The cycle starting at 1F is periodically repeated so that, for example, if a high residential electrical load is being used, the engine may be periodically started up to restore the batteries 36 to the desired level. To avoid too much starting and stopping of the engine 26', the sensing intervals may be spaced by a desired time period such as once every hour. Alternatively, shorter sensing intervals may be employed, but different turn-on and turn-off control voltage levels may be established to avoid the starting up of the automobile engine too frequently.

It may also be noted that more complex sensing and control systems may be included. Thus, for example, if the automotive batteries are low and the residential batteries are only moderately charged, the engine generator 26 may directly charge the automotive storage batteries 52, and the batteries 36 need not be connected in the circuit at all. In addition, selective $T_R$ levels may be provided depending on whether the engine 26' is operating to charge the batteries 36 or not. It may well be desirable to store heat in the heating subsystem 28 for future use whenever the engine generator is running; however, if the generator 26" is not needed, a lower level of storage $T_R$ may be deemed adequate. Numerous other automatic, semi-automatic, and manual sequences can be incorporated; for example, one user may wish, on most occasions, to "fine-tune" the master control logic based upon the weather forecast so as to, for example, reduce to an absolute minimum the use of backup fuels. On another occasion, however, as before a major winter storm, that same user may wish to "fully-charge" the system, i.e., to maximize $E_R$, $T_R$, $E_A$ and fill up the auto fuel tank 44.

An exemplary automobile incorporated within the integrated energy system of the present invention is powered by a hybrid electric drive means which comprises a combustion engine for driving an associated electrical generator, automobile energy storage means and an electrically powered primary automobile drive motor which propels the automobile. As particularly contemplated by the present invention, the automobile would incorporate a low-power constant-speed liquid-fuel engine. This engine may be of either internal or external combustion design and would optimally be designed to minimize engine emissions and could be highly efficient due to the constant load upon the combustion engine itself, as would be provided by an electric generator. Further, this engine could be sized such that it would enable the automobile to maintain a steady 30-50 mph speed on a level road so that the automobile could maintain a safe road speed in the eventuality that the automobile electrical storage batteries were completely drained. On long-distance trips, the combustion engine would provide the needed range by, for example, recharging the automobile storage batteries during meal breaks and rest stops.

Incidentally, it is assumed that the automobile is a four passenger vehicle of the Vega/Pinto/Audi-Fox size, having a curb weight of about 1100 kilograms or 2500 pounds, plus 800 kilograms or 1800 pounds of lead-acid batteries. Other higher energy density batteries could also be employed.

Concerning the automotive system, it may also be noted that the coolant system and the exhaust system are designated by the reference numeral 27 in FIG. 1, and the heat transfer apparatus 62 is coupled to these subsystems 27 of the automotive engine. Of course, the exhaust gases are vented to the open air outside the residence, following extraction of heat. Also, the gas tank 44 may be provided with a section 44' (which might be a separate tank), and which may be connected by a manually operated valve to the engine, to avoid emptying the fuel tank 44 while charging the batteries 36 of the residential system.

For illustrative purposes, a specific exemplary embodiment of the integrated energy system of the present invention will now be discussed in detail.

The residence will be considered to have approximately 230 square meters of floor and garage area and a roof pitch approximately 40° above the horizontal. This configuration will result in approximately 150 square meters of roof area available for exposure to solar radiation on the south-facing half of the roof.

The automobile may be any four-passenger vehicle in the generally "small car" class and, for the purposes hereof, will be considered to have a wheel base of approximately 2.5 meters, a curb weight of approximately 1100 Kg plus an additional 800 Kg of lead-acid storage batteries.

Electrical power consumption of a primary drive motor capable of operating the automobile could be expected to be approximately 5 kilometers per kilowatt-hour of electricity, or 5 "km/kWh(e)" at a speed of 80 km/h, and the range of such an automobile, on batteries alone, would be approximately 100 km. This range could be extended by regenerative braking of the hybrid electric automobile, (charging the battery by coupling the electric motor to the wheels while slowing the car), as well as by operating an on-board liquid fuel, constant speed, constant load continuous combustion turbine engine to drive an on-board electric generator to energize the electric drive motor and/or charge the storage batteries. This on-board electric generator should have an output of approximately 15 kW(e).

It should be noted that the combustion engine is of a size which is capable of driving the automobile and maintaining highway speed in the event the batteries are completely drained.

The interface interconnecting the residence and the automobile is provided with a power umbilical cable having a capacity of 15 kW(e) for those periods where the automobile generator is functioning as a backup for the solar collectors, such as at night during extended periods of inclement weather.

Additionally, the interface is provided with an electrical umbilical to allow transducer signals and electronic control signals to flow in both directions between the residence and the automobile.

Also, the interface means is provided with a heat transfer umbilical 62 to allow engine and exhaust coolant to circulate through the Auto-Residence heat exchanger which may be located in the residence heat storage component of heating subsystem 28.

ELECTRICITY REQUIREMENTS FOR INTEGRATED ENERGY SYSTEM

1. Residence

For cooking, lights, and appliances (except clothes dryer) and storage and power conditioning losses, we assume residential electricity needs, $E_R$, of $$E_R = 800 \text{ kWh(e)/month}$$

2. Automobile

We assume a commuting round trip of 100 kilometers (about 60 miles) per day and 200 kilometers of travel each weekend, or 36,500 kg/year. Then, automobile electricity requirements, $E_A$, are $$\begin{aligned} E_A &= \frac{\text{kilometers traveled}}{\text{mileage}} \\ &= \frac{36{,}500 \text{ km/year}}{5 \text{ km/kWh(e)}} \\ &= 7{,}300 \text{ kWh(e)/year} \\ &= 20 \text{ kWh(e)/d} \simeq 610 \text{ kWh(e)/month} \end{aligned}$$

3. Total $$\begin{aligned} E_T &= E_R + E_A \\ &= (800 + 610) \text{ kWh(e)/month} \\ &= 1410 \text{ kWh(e)/month} \end{aligned}$$

= 46.4 kWh(e)/d

COLLECTOR AREA TO MEET TOTAL NEEDS FOR ELECTRICITY, C(E_T)

Assume average solar radiant energy or "insolation", I, of six kilowatt hours per square meter per day, or 6.0 kWh(h)·m$^{-2}$·d$^{-1}$, typical for Albuquerque and other regions in the sun belt:

$$C(E_T) = \frac{E_T}{(n_{SE})(I)}$$

where C(E$_T$) is the required collector area, and n$_{SE}$ is the collector conversion efficiency of insolation to electricity. For n$_{SE}$=10%, $$C(E_T) = \frac{46.4 \text{ kWh(e)} \cdot d^{-1}}{(0.1 \text{ kWh(e)} \cdot \text{kWh(h)}^{-1})(6.0 \text{ kWh(h)} \cdot m^{-2} \cdot d^{-1})}$$
$$= 77 \text{ m}^2$$

This is roughly one-half of the available rooftop area of 150 m$^2$, and would generate a peak power of about 8 kW(e).

RESIDENTIAL NEEDS FOR HEAT, H_R

Residential heating needs (for hot water, space heating, and clothes drying) would be met by collecting and storing the so-called "waste" heat from the photovoltaic collectors.

Total insolation upon the collectors, I$_{T(PV)}$, is $$I_{T(PV)} = C(E_T) I$$
$$= 77 \text{ m}^2 \cdot 6.0 \text{ kWh(h)} \cdot m^{-2} \cdot d^{-1}$$
$$= 462 \text{ kWh(h)/d}$$
$$\simeq 14,000 \text{ kWh(h)/month}$$

Useful heat remaining, i.e., insolation not converted to electricity or lost outside the integrated system is $$H_{PV} = I_{T(PV)} - E_T - \text{Losses}$$
$$= (14,000 - 1,400) \text{ kWh(h)/month} - \text{Losses}$$
$$= \frac{12,600 \text{ kWh(h)}}{\text{month}} \cdot \frac{3,412 \text{ Btu}}{\text{kWh(h)}} - \text{Losses}$$
$$\simeq 43 \cdot 10^6 \text{ Btu/month} - \text{Losses}$$

If losses equal about 30% of the total heat not converted to electricity, then $$H_{PV} \simeq 10^6 \text{ Btu/d}$$

Peak heating requirements for a well-designed 230 square meters (2500 ft$^2$) house are not likely to exceed 10$^6$ Btu per day even at temperatures of −18° Celsius (0° Fahreheit). Thus, the waste heat from the photovoltaic collectors would usually exceed the heating requirements of the home, and the automobile backup system would rarely be needed to supplement the solar system.

BACKUP TO THE PRIMARY SOLAR SYSTEM

The turbine-generator of the automobile is used as backup for both the automobile and the residence.
Residential electric needs are $E_R$ = 800 kWh(e)/month = 26.3 kWh(e)/d Thus, the 15 kW(e) turbine-generator would meet the daily residential needs for electricity in less than two hours.

The engine waste heat, usually radiated away, is, in this system, collected to meet the residential needs for heat. The heat of the auto turbine radiator is transferred to the residence energy storage means with a heat exchanger. Similarly, a heat exchanger can be placed in the line in the garage that will vent the turbine exhaust to the outdoors, thereby capturing a portion of that heat.

Residential heating requirements vary much more from day to day and from season to season than do the requirements for electricity. Therefore, we need to look at the ability of the turbine to back up a range of heating requirements.

The generation of heat by the automobile, H$_A$, is given by

H$_A$ = (fuel flow rate)·(fuel heat content)-(heat content of the electricity produced)

= (1.5 gal/(h))(130,000 Btu/gal)-(15 kWh(e)/(h))(3,412 Btu/kWh(e))

= (195,000−51,000) Btu/h

= 143,000 Btu/h

Some of this heat would escape and would be lost to the outdoors in spite of the heat exchanger in the exhaust vent line. Another portion of the heat would be radiated into the garage space, and, although the garage would be warmed, this heat, too, would be unavailable to the residence. It is a reasonable assumption that 100,000 Btu/h would remain and be available to the residence. An earlier section stated that peak heating requirements were unlikely to exceed 10$^6$ Btu/d even on the coldest days, and typical winter days are likely to average 200,000–400,000 Btu/d. Thus, the hybrid auto turbine-generator would meet daily heating needs by running up to a few hours per day during those days when insolation is inadequate.

Incidentally, although solar radiation has been the primary energy source in the foregoing system, a small windmill with an associated electrical generator, or other suitable source of power derived from the environment could be used. Of course, wind arises principally from temperature variations caused by the sun, and wind energy is therefore included within the designation "solar energy". It is also noted in passing that the subcomponents such as blocks 52, 54, 56 and 58 are individually connected to the associated control circuit 48, and this is of course also true of other adjacent blocks and their associated control circuits, even though a single dashed line control circuit may be used.

Having thus described an exemplary embodiment of the integrated energy system of the present invention, as well as a method of selectively transferring energy within an integrated energy system, it is believed that those skilled in the art will appreciate that the present invention attains the advantages and objects set forth above. Further, it should be appreciated by those skilled in the art that the present disclosure of an integrated energy system which comprises a residence and an automobile and wherein environmental energy is the primary energy source for this system and wherein the automobile provides a supplementary source of energy for the system, is exemplary only, and that various modifications, adaptions, and alternative embodiments thereof may be made within the scope and spirit of the present invention.

What is claimed is:

1. An integrated energy system comprising a residence and an automobile wherein environmental energy is the primary energy source for said system and wherein said automobile provides a backup or supplementary source of energy for said system, said system comprising:

environmental energy collector means associated with said residence for collecting environmental energy and generating electrical energy from a portion thereof;

a residential energy system including storage means for storing electrical energy generated within said integrated energy system;

hybrid electric drive means associated with said automobile and comprising a combustion engine for driving an associated electrical generator, automobile energy storage means for storing electrical energy generated within said integrated system and an electrically powered primary automobile drive motor for propelling said automobile; and interface means for interconnecting said residence and said automobile for selectively transferring energy from said residence to said automobile and from said automobile to said residence.

2. An integrated energy system as defined in claim 1 wherein said environmental energy collector means constitutes radiant solar energy collection means.

3. The integrated energy system of claim 1, wherein said residential energy system comprises a thermal energy subsystem including an environmental thermal energy collector means and means for storing thermal energy.

4. The integrated energy system of claim 3 wherein said interface means comprises:

heat exchanger means for transferring thermal energy from said automobile to said thermal energy subsystem of said residence.

5. The integrated energy system of claim 4, wherein said heat exchanger means comprises first means, including a cooling subsystem associated with said combustion engine for conducting heat generated during combustion away from said engine, means for interconnecting said residential thermal energy subsystem with said cooling subsystem, and to selectively transfer said heat generated during combustion to the residential thermal energy subsystem.

6. The integrated energy system of claim 4, wherein said heat exchanger means comprises:

means including an exhaust subsystem associated with said combustion engine for conducting hot exhaust gases away from said engine, a cooling system associated with said exhaust subsystem for conducting heat generated during combustion away from said exhaust subsystem, means for interconnecting said residential thermal energy subsystem with said cooling system to selectively receive at least a portion of the heat generated during combustion.

7. The integrated energy system of claim 1, wherein said interface means includes electrical flow control means for controlling electrical flow within said system, said electrical flow control means comprising:

means for sensing electrical energy storage levels within said residential energy storage means and said automobile electrical storage means;

means for transferring electrical energy from said residential energy storage means to said automobile electrical storage means when said electrical energy storage level of said residential energy storage means is greater than or equal to a preselectable value and when said electrical energy storage level of said automobile electrical storage means is less than a maximum storage value; and means for transferring electrical energy from said automobile to said residential energy storage means when said electrical energy storage level of said residential energy storage means is less than a preselectable value.

8. The integrated energy system of claim 7, wherein said interface means includes thermal flow control means for controlling thermal energy flow within said system, said thermal flow control means comprising:

means for sensing a thermal energy storage level within said residential energy storage means; and means for transferring thermal energy from said automobile to said residential energy storage means when said thermal energy storage level of said residential energy storage means is less than a preselectable value.

9. The integrated energy system of claim 7, wherein said means for transferring electrical energy from said automobile to said residential energy storage means comprises:

means for automatically starting said combustion engine associated with said automobile if said combustion engine is not running;

means for switching said associated electrical generator to an electrical current generating mode of operation if said electrical generator is not in said generating mode of operation; and means for transferring electrical energy directly from said generator to said residential energy storage means.

10. The integrated energy system of claim 8, wherein said means for transferring thermal energy from said automobile to said residential energy storage means comprises:

means for automatically starting said combustion engine of said automobile if said combustion engine is not running; and means for switching the thermal flow control means associated with said residence and said automobile to a mode of operation which will transfer thermal energy from said combustion engine to said residential energy system.

11. An integrated energy system as defined in claim 1 wherein said environmental energy collector means includes photovoltaic cells exposed to solar radiation.

12. A method of selectively transferring energy within an integrated energy system comprising a residence and an automobile wherein environmental energy is the primary energy source for said system and wherein said automobile provides a supplementary source of energy for said system, said energy being selectively transferred from said residence to said automobile and from said automobile to said residence, comprising the steps of:

sensing electrical energy storage levels within residential energy storage means and automobile electrical storage means;

transferring electrical energy from said residential energy storage means to said automobile electrical storage means when said electrical energy storage level of said residential energy storage means is greater than or equal to a preselectable value and when said electrical energy storage level of said automobile electrical storage means is less than a maximum storage value; and transferring electrical energy from said automobile to said residential energy storage means when said electrical energy storage level of said residential energy storage means is less than a preselectable value.

13. The method of claim 12 comprising the additional steps of:

sensing a thermal energy storage level within said residential energy storage means; and transferring thermal energy from said automobile to said residential energy storage means when said thermal energy storage level of said residential energy storage means is less than a preselectable value.

14. The method of claim 12 wherein said step of transferring electrical energy from said automobile to said residential energy storage means comprises the substeps of:

starting a combustion engine associated with said automobile if said combustion engine is not running;

switching an electrical generator associated with said combustion engine to an electrical current generating mode of operation if said electrical generator is not in said generating mode of operation; and transferring electrical energy directly from said generator to said residential energy storage means.

15. The method of claim 13 wherein said step of transferring thermal energy from said automobile to said residential energy storage means comprises the substeps of:

automatically starting a combustion engine associated with said automobile if said combustion engine is not running; and switching heat exchange means associated with said residence and said automobile to a mode of operation which will transfer thermal energy from said combustion engine to said residence or said residential energy storage means.

16. The method of claim 13 comprising the additional step of selectively interconnecting said residence and said automobile by an interface means; and wherein said steps of sensing said electrical energy storage levels and said thermal energy storage level are performed continuously while said residence and said automobile are interconnected by said interface means.

17. A substantially self-contained integrated energy system comprising in combination a residence and an automobile wherein solar energy is the primary energy source for said system and wherein said automobile provides a backup or supplementary source of energy for said system, said system requiring no connection with public utility systems and comprising:

photovoltaic means associated with said residence for collecting radiant solar energy and converting a portion thereof to electrical energy;

residential energy storage means for storing electrical energy generated within said integrated energy system and for storing thermal energy, including radiant solar energy absorbed by said photovoltaic means and not converted into electrical energy, and thermal energy generated within said integrated energy system;

hybrid electric drive means associated with said automobile and comprising in combination a combustion engine for driving an associated electrical generator, automobile energy storage means for storing electrical energy generated within said integrated energy system and an electrically powered primary automobile drive motor for propelling said automobile; and interface means comprising electrical energy exchange means for selectively transferring electrical energy from said residence to said automobile and from said automobile to said residence, and heat exchange means for transferring thermal energy from said automobile to said residential energy storage means.

18. An integrated energy system for minimizing fuel utilized by the home and automobile, comprising:

a residence, means associated with said residence for obtaining energy from the environment in the vicinity of said residence, and for converting at least a portion of said energy to electrical energy;

residential energy storage means for storing at least a portion of said electrical energy;

an automobile, including hybrid electric drive means, comprising in combination a combustion engine, an electrical generator coupled to said combustion engine, energy storage means for storing electrical energy generated within said integrated energy system and an electrically powered primary automobile drive motor for propelling said automobile;

means for electrically interconnecting said residence and said automobile;

means for sensing the state of said energy storage means associated with said automobile and for transferring energy from said residential energy storage means to said automobile when the energy content of said storage means associated with said automobile, is below a predetermined level;

means for sensing the state of said residential energy storage means and for automatically initiating operation of said automobile combustion engine, when the energy content of said residential energy storage means is below a predetermined level; and means to supply the resultant electrical energy generated by the automobile electric generator to said residential energy storage means.

19. An integrated energy system comprising a residence and an automobile wherein said automobile provides a backup source of energy for said system, said system comprising:

a residential energy system including storage means for storing electrical energy generated within said integrated energy system;

hybrid electric drive means associated with said automobile and comprising a combustion engine for driving an associated electrical generator, automobile energy storage means for storing electrical energy generated within said integrated system and an electrically powered primary automobile drive motor for propelling said automobile; and interface means for interconnecting said residence and said automobile for selectively transferring energy from said residence to said automobile and from said automobile to said residence.

* * * * *